(12) United States Patent
Jessberger et al.

(10) Patent No.: US 7,938,095 B2
(45) Date of Patent: May 10, 2011

(54) OIL PAN BAFFLE AND GASKET

(75) Inventors: Thomas Jessberger, Asperg (DE); Roman Eder, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 412 days.

(21) Appl. No.: 12/209,229

(22) Filed: Sep. 12, 2008

(65) Prior Publication Data
US 2010/0066033 A1   Mar. 18, 2010

(51) Int. Cl.
*F02B 77/00* (2006.01)
(52) U.S. Cl. .................................. 123/195 C; 277/591
(58) Field of Classification Search .............. 123/195 C, 123/195 H; 184/6.5; 277/591
See application file for complete search history.

(56) References Cited

U.S. PATENT DOCUMENTS 6,019,071 A * 2/2000 Maciejka, Jr. ............. 123/41.35
* cited by examiner

*Primary Examiner* — Noah Kamen

(57) ABSTRACT

An oil pan baffle is secured by a securing device on the oil pan. The securing device has an oil pan gasket with a gasket body matched to a sealing contour of an oil pan relative to a crankcase and securing elements that are connected to the gasket body and project inwardly away from an inner perimeter of the gasket body. The securing elements act on contact surfaces of the oil pan baffle, with which contact surfaces the oil pan baffle is positioned in receptacles of the oil pan, and exert pressure effecting secure fixation of the oil pan baffle on the oil pan when the oil pan gasket is compressed by mounting the oil pan on the crankcase.

16 Claims, 6 Drawing Sheets

OIL PAN BAFFLE AND GASKET

BACKGROUND OF THE INVENTION

The invention relates to an oil pan baffle used in the interior of an internal combustion engine of a motor vehicle for guiding the oil flow. Such an oil pan baffle ensures that under extreme driving conditions (great acceleration or deceleration forces acting on the motor vehicle) or when driving through curves the crankshaft will not be exposed to oil sloshing in the oil pan and also prevents foaming of the oil. Additionally, the oil pan baffle ensures that the intake of the oil pump is constantly covered with oil so that the oil pump cannot suck in air.

Oil pan baffles are usually connected by means of several screws, generally six to eight screws, preferably to the crankcase or alternatively to the oil pan.

This is disadvantageous because an additional mounting step for attaching the oil pan baffle is required. Additional fastening elements (usually six to eight screws) are required. There is also the risk that such fastening elements become loose and drop into the oil pan.

SUMMARY OF THE INVENTION

It is therefore an object of the present invention to provide an easier way of mounting an oil pan baffle.

In accordance with the present invention, this is achieved in that a securing device for the oil pan baffle is provided that is in the form of an oil pan gasket comprising a gasket body, matched to a sealing contour of an oil pan relative to a crankcase, and securing elements connected to the gasket body. The securing elements project inwardly away from an inner perimeter of the gasket body. The securing elements act on contact surfaces of the oil pan baffle, with which contact surfaces the oil pan baffle is positioned in receptacles of an oil pan. The securing elements exert pressure effecting secure fixation of the oil pan baffle on the oil pan when the oil pan gasket is compressed by mounting the oil pan on the crankcase.

The invention is based on the simple principle that the oil pan gasket can be used for securing the oil pan baffle in the oil pan. By providing the oil pan gasket with special securing elements projecting inwardly and resting or acting on the contacts surfaces of the oil pan baffle that, in turn, rest in receptacles of the oil pan, the oil pan baffle is tightly clamped to the oil pan by the elastic compression of the securing elements of the oil pan gasket by the compression forces acting through the securing elements on the contact surfaces and the receptacles when the oil pan is mounted on the crankcase. No additional fasteners in the form of screws etc. are required. The risk of fasteners becoming detached and dropping into the oil pan is eliminated.

Moreover, the securing elements can provide an initial transport safety means in that they elastically clamp the contact surfaces of the oil pan baffle in the receptacles of the oil pan before the oil pan is mounted.

Due to the elastic nature of the oil pan gasket and its integrated securing elements, the securing elements compensate play between the oil pan and the oil pan baffle that may occur as the result of manufacturing tolerances or because of different thermal expansion coefficients of the oil pan and the oil pan baffle.

The securing elements can be vulcanized to the contact surfaces of the oil pan baffle and the resulting assembly of oil pan baffle and attached securing device facilitates the mounting procedure even more.

The securing device in the form of the oil pan gasket can also be attached or mounted in other ways on the oil pan baffle before installation on the oil pan.

The invention further relates to a method for securing an oil pan baffle on an oil pan. The method comprises the steps of:
  integrating securing elements into a gasket body of an oil pan gasket such that the securing elements project inwardly away from an inner perimeter of the gasket body;
  positioning the securing elements of the oil pan gasket on contact surfaces of the oil pan baffle;
  compressing the oil pan gasket by mounting the oil pan and the oil pan baffle received in the oil pan on a crankcase and causing the securing elements to exert pressure for effecting secure fixation of the oil pan baffle on the oil pan.

By integrating securing elements into the oil pan gasket that thus becomes a securing device in accordance with the present invention, mounting of the oil pan baffle is simplified greatly. No additional fasteners must be provided and tightened. The oil pan baffle is simply placed into the oil pan and the oil pan together with the oil pan baffle is attached by the usual fastening means employed for attaching the oil pan to the crankcase and, simultaneously to the attachment of the oil pan, the oil ban baffle is secured also.

Preferably, the oil pan baffle is first positioned in receptacles of the oil pan and the oil pan gasket is then placed onto the oil pan so that the securing elements clamp the oil pan baffle in the receptacles thus providing an initial transport safety means for the oil pan baffle in the oil pan until the oil pan is fastened to the crankcase.

It is also possible to place the oil pan baffle with the contact surfaces into receptacles of the oil pan and to then secure the oil pan baffle by dip-on means.

The oil pan gasket can also be attached to the oil pan baffle in that the securing elements are vulcanized onto the contact surfaces of the oil pan baffle. The oil pan baffle is then placed into the oil pan and the oil pan gasket is then arranged on the oil pan, i.e., inserted into the receiving groove for the oil pan gasket.

The oil pan gasket can also be attached by other means to the oil pan baffle.

DESCRIPTION OF THE PREFERRED EMBODIMENTS

Figure 1:
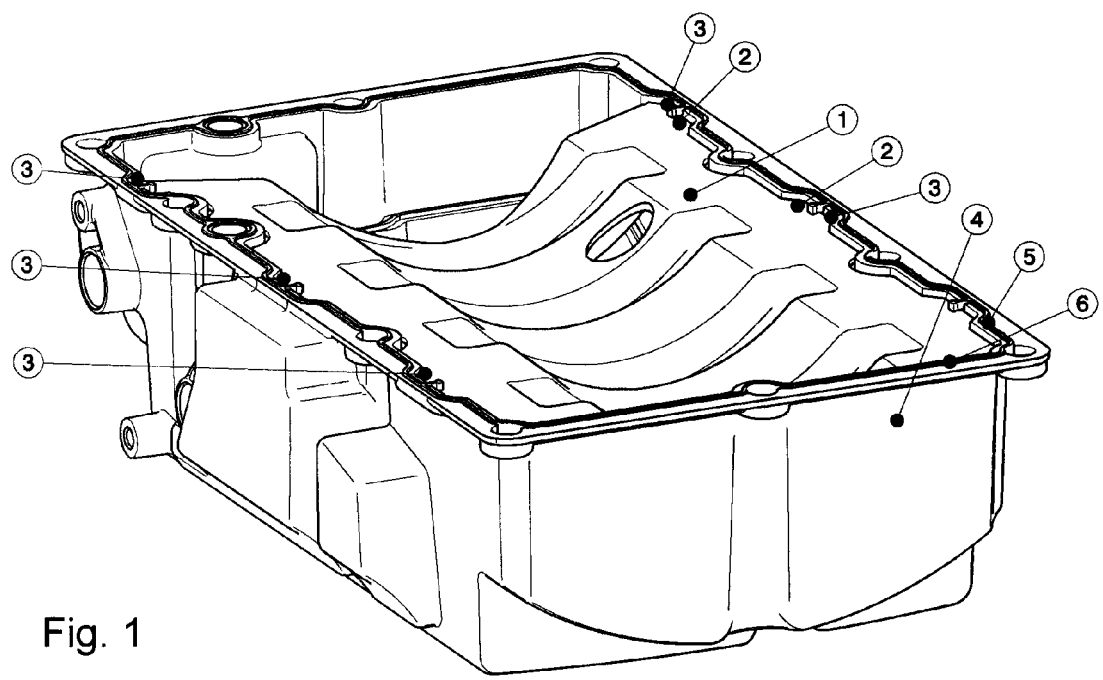
FIG. 1 shows an oil pan baffle seated on an oil pan and secured by the securing device according to the present invention.
Figure 1A:
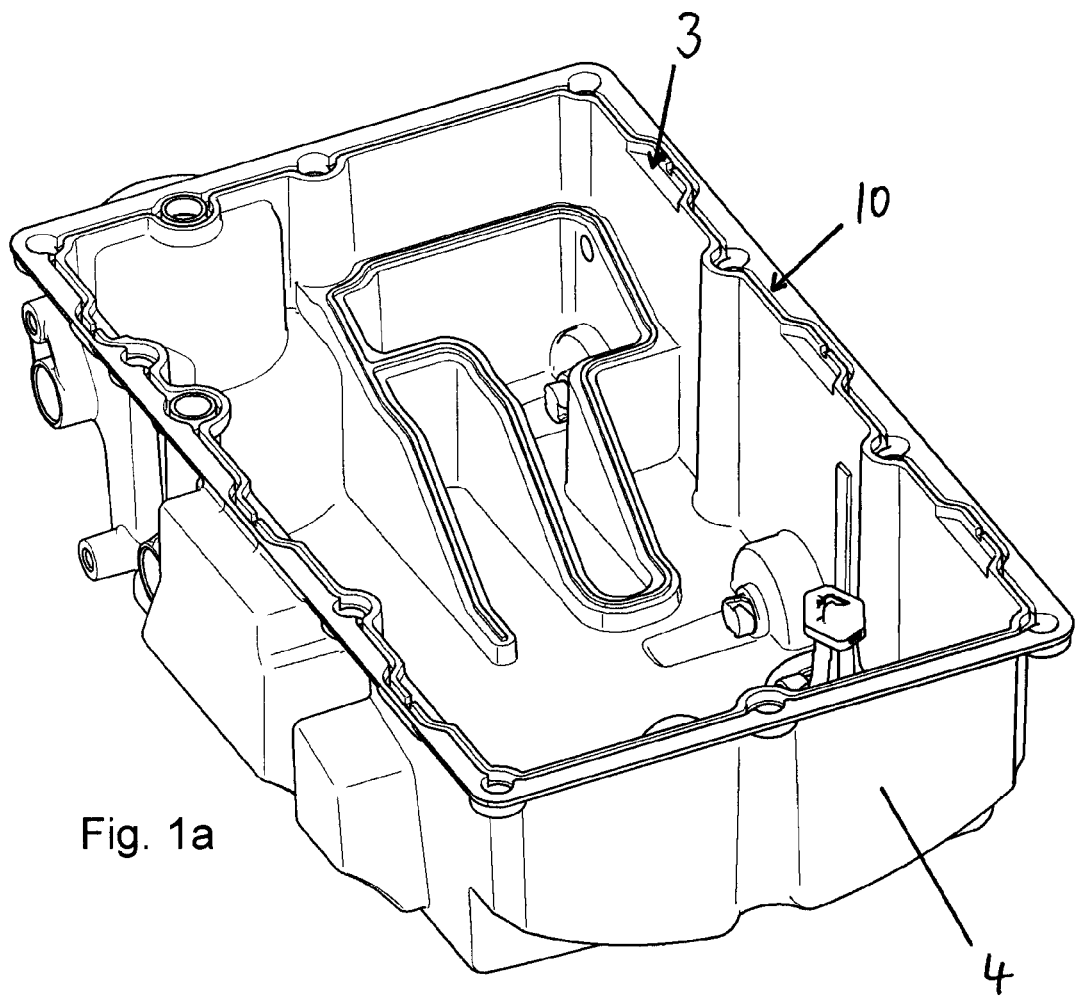
FIGS. 1*a* and 1*b* show the oil pan and the oil baffle separately.
Figure 1B:
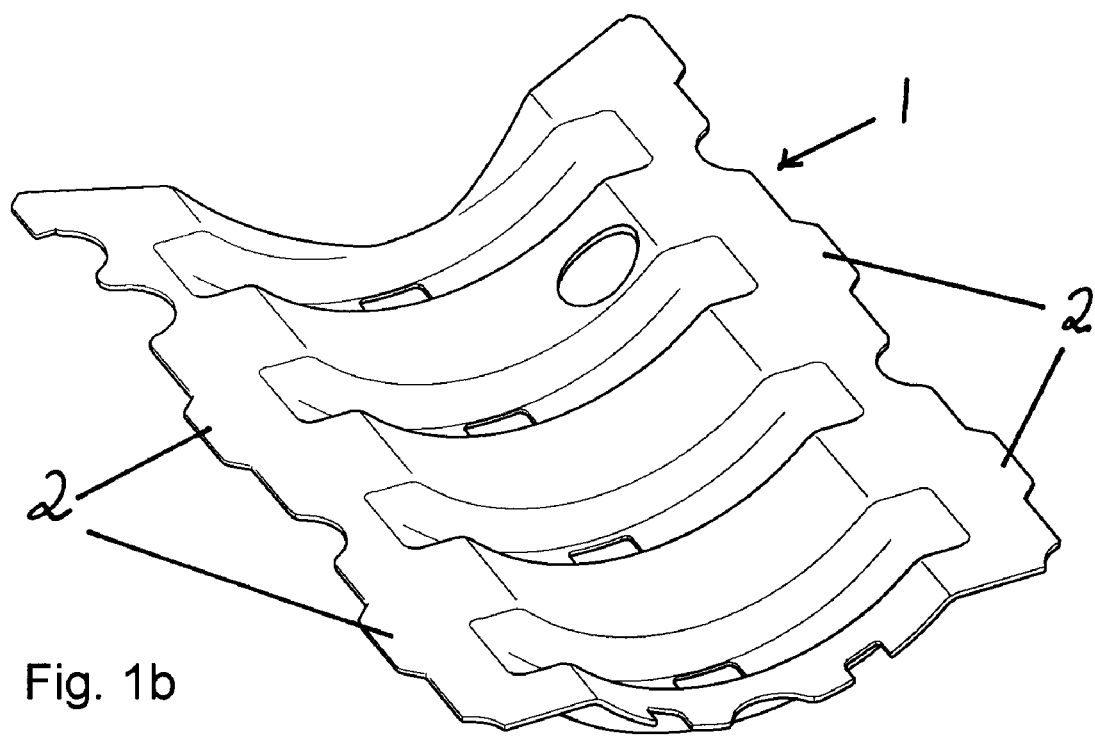

FIG. 1 illustrates an oil pan baffle 1 positioned with contact or support surfaces 2 in receptacles 3 of an oil pan 4. A securing device 5 embodied as an oil pan gasket having a gasket body 6 and securing elements 7 projecting inwardly from in inner perimeter of the gasket body 6 is arranged on the oil pan 3.

Figure 2:
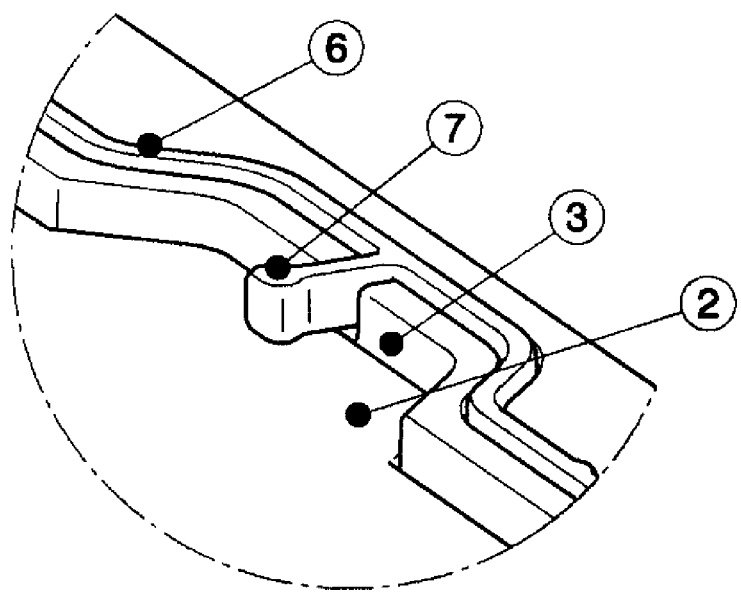
FIG. 2 shows a detail of the securing device.

As can be seen especially in the detail view of FIG. 2, the securing elements 7 are an integral or monolithic part of the gasket and are made of the same material as the oil pan gasket. Oil pan gaskets and the (elastic) material used for their manufacture are well known in the art and need not be discussed here.

FIG. 2 shows that the securing elements 7 integrated into the oil pan gasket rest on the contact surfaces 2 of the oil pan baffle 1 in the receptacles 3. In this way, the securing elements 7 clamp the oil pan baffle 1, that has been placed into the oil pan 4 prior to installing the securing device 5, by their elastic properties in the receptacles 3 of the oil pan 4. The securing elements 7 in this way provide an initial transport safety means that provides a transport securing action for the oil pan baffle 1 on the oil pan for transport to the site of final assembly.

As an alternative to the disclosed concept of securing the oil pan baffle 1 for transport by means of the securing device 5 to be installed on the oil pan 4 after the oil pan baffle 1 has been positioned thereon, it is possible to fasten the securing device 5 on the oil pan baffle 1 either by fastening means or by vulcanizing the securing elements 7 of the securing device 5 on the oil pan baffle 1.

Figure 3:
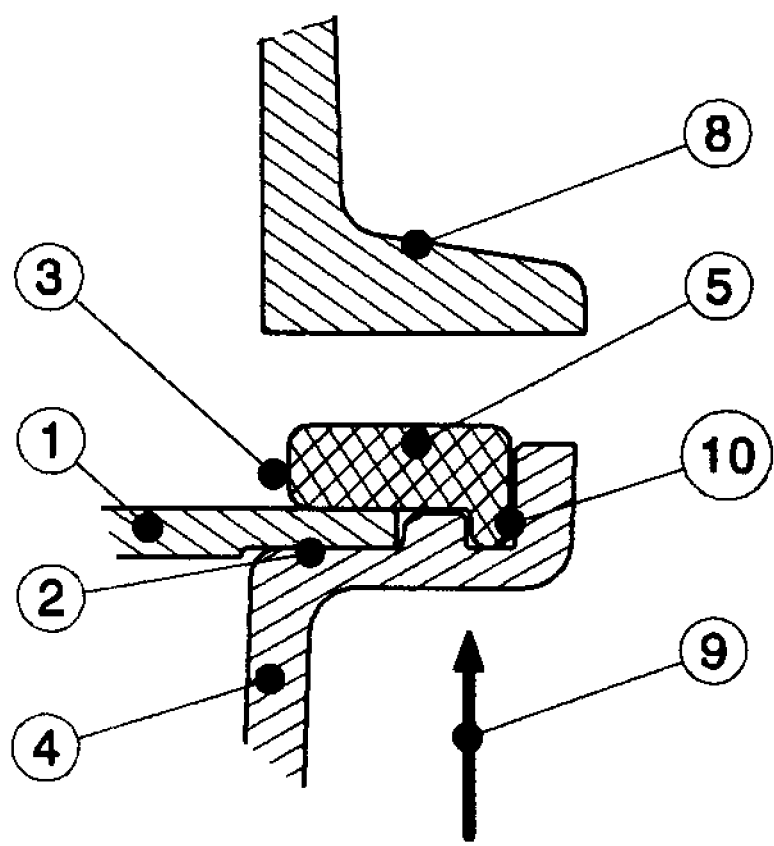
FIG. 3 shows schematically in section the arrangement of an oil pan, an oil pan baffle, a securing device according to the invention, and a crankcase before attachment of the oil pan on the crankcase.

FIG. 3 shows a schematic section view of the oil pan 4 and the oil pan baffle 1 as well as the crankcase 8 in aligned position before mounting in the indicated assembly direction 9. The securing device 5 is arranged in the gasket groove 10 of the oil pan 4 and is still in its initial uncompressed state. The securing element 7 rests on the contact surface 2 of the oil pan baffle 1 arranged in the receptacle 3 of the oil pan 4.

The illustration of FIG. 3 shows the securing element 7 in contact with the contact surface 2 of the oil pan baffle. This contact can be a clamping contact when installing the oil pan baffle 1 first and later arranging the securing device 5 with securing elements 7 thereon, but it can also be understood as the securing elements 7 being vulcanized to the contact surfaces 2 of the oil pan baffle 1 which means that the oil pan baffle 1 and the securing device form a unit and are installed together on the oil pan 4.

Figure 4:
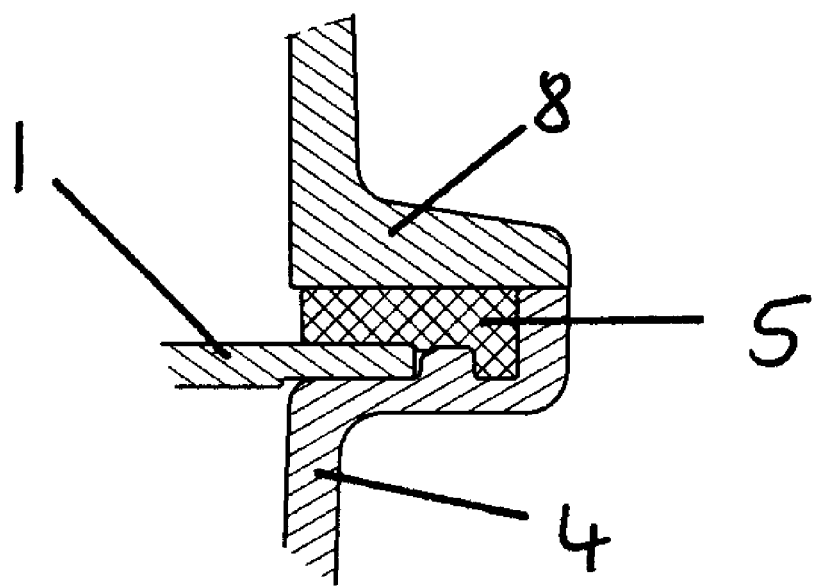
FIG. 4 shows schematically in section the arrangement of FIG. 3 after the oil pan has been attached and illustrates in particular the compression and deformation of the securing device.

FIG. 4 shows the oil pan 4 being fastened to the crankcase 8. The fasteners that fasten the oil pan force the elastic securing device 5 into the gasket groove 10 and also compress the securing device 5 in the form of the gasket for proper sealing of the oil pan relative to the crankcase. At the same time, the securing element 7 also presses down on the oil pan baffle in the area of the contact surface 2 and forces the oil pan baffle 1 tightly against the receptacle 3 of the oil pan 4. In this way the oil pan baffle 1 is fixedly secured between the oil pan 4 and the crankcase 8 in the same mounting step that secures the oil pan 4 on the crankcase 8.

The securing device 5 secures the oil pan baffle 1 without allowing any play once the oil pan 4 is mounted on the crankcase or engine. The oil pan baffle 1 is seated tightly and secured fixedly on the oil pan. No additional fastening elements (such as screws) are required; no additional assembly time is required for inserting and tightening such fastening elements.

Even when the contact surface or the oil pan under operating conditions will relax to some degree or different thermal expansion coefficients cause play between the components, the securing device 5 according to the invention will compensate any fluctuations.

It is possible to secure the oil pan baffle by means of clip-on devices on the oil pan. In this situation, the above described clamping action provided by the securing device 5 with the securing elements 7 upon mounting the oil pan is desirable for acoustic reasons.

In order to avoid the extra mounting step mentioned in the beginning, the oil pan baffle can also be welded to the receptacles of the oil pan; in this case the securing device 5 with securing elements 7 is not required for securing the oil pan baffle 1.

While specific embodiments of the invention have been shown and described in detail to illustrate the inventive principles, it will be understood that the invention may be embodied otherwise without departing from such principles.

What is claimed is:

1. A securing device for an oil pan baffle, the securing device comprising an oil pan gasket comprising a gasket body matched to a sealing contour of an oil pan relative to a crankcase and securing elements connected to said gasket body and projecting inwardly away from an inner perimeter of said gasket body, wherein said securing elements act on contact surfaces of an oil pan baffle, with which contact surfaces the oil pan baffle is positioned in receptacles of an oil pan, and exert pressure effecting secure fixation of the oil pan baffle on the oil pan when the oil pan gasket is compressed by mounting the oil pan on the crankcase.

2. The securing device according to claim 1, wherein said securing elements provide an initial transport safety means and clamp the contact surfaces of the oil pan baffle in the receptacles before the oil pan is mounted.

3. The securing device according to claim 1, wherein said securing elements compensate play between the oil pan and the oil pan baffle.

4. The securing device according to claim 1, wherein said securing elements compensate effects of different thermal expansion coefficients of the oil pan and the oil pan baffle.

5. The securing device according to claim 1, mounted on the oil pan baffle before installation on the oil pan.

6. The securing device according to claim 5, wherein said securing elements are vulcanized to the contact surfaces of the oil pan baffle.

7. A method for securing an oil pan baffle on an oil pan, the method comprising the step of:
   integrating securing elements into a gasket body of an oil pan gasket such that the securing elements project inwardly away from an inner perimeter of the gasket body;
   positioning the securing elements of the oil pan gasket on contact surfaces of the oil pan baffle;
   compressing the oil pan gasket by mounting the oil pan and the oil pan baffle received in the oil pan on a crankcase and causing the securing elements to exert pressure for effecting secure fixation of the oil pan baffle on the oil pan.

8. The method according to claim 7, wherein, in the step of positioning, the oil pan baffle is first positioned in receptacles of the oil pan and the oil pan gasket is then placed onto the oil pan so that the securing elements clamp the oil pan baffle in the receptacles so that an initial transport safety means is provided.

9. The method according to claim 7, wherein, in the step of positioning, the securing elements are vulcanized onto the contact surfaces of the oil pan baffle and the oil pan baffle is placed into the oil pan and the oil pan gasket is then arranged on the oil pan.

10. The method according to claim 7, wherein, in the step of positioning, the oil pan gasket is attached to the oil pan baffle and the oil pan baffle is placed into the oil pan and the oil pan gasket is then arranged on the oil pan.

11. An assembly of an oil pan, an oil pan baffle, and a securing device, wherein said securing device comprises an oil pan gasket comprising a gasket body matched to a sealing contour of said oil pan relative to a crankcase and securing elements connected to said gasket body and projecting inwardly away from an inner perimeter of said gasket body, wherein said securing elements act on contact surfaces of said oil pan baffle, with which contact surfaces said oil pan baffle is positioned in receptacles of said oil pan, and exert pressure effecting secure fixation of said oil pan baffle on said oil pan when said oil pan gasket is compressed by mounting said oil pan on the crankcase.

12. The assembly according to claim 11, wherein said securing elements provide an initial transport safety means and clamp said contact surfaces of said oil pan baffle in said receptacles before said oil pan is mounted.

13. The assembly according to claim 11, wherein said securing elements compensate play between said oil pan and said oil pan baffle.

14. The assembly according to claim 11, wherein said securing elements compensate effects of different thermal expansion coefficients of said oil pan and said oil pan baffle.

15. The assembly according to claim 11, wherein said securing device is mounted on said oil pan baffle before installation on said oil pan.

16. The assembly according to claim 15, wherein said securing elements are vulcanized to said contact surfaces of said oil pan baffle.

\* \* \* \* \*